(12) United States Patent
Lesizza et al.

(10) Patent No.: US 9,522,486 B2
(45) Date of Patent: Dec. 20, 2016

(54) METHOD OF PRODUCING TOOLING FOR RESIN TRANSFER MOLDING

(71) Applicant: SNECMA, Paris (FR)

(72) Inventors: Emilie Lesizza, Courbevoie (FR); Dominique Magnaudeix, Yerres (FR)

(73) Assignee: SNECMA, Paris (FR)

( * ) Notice: Subject to any disclaimer, the term of this patent is extended or adjusted under 35 U.S.C. 154(b) by 195 days.

(21) Appl. No.: 14/379,884

(22) PCT Filed: Feb. 21, 2013

(86) PCT No.: PCT/FR2013/050358
§ 371 (c)(1),
(2) Date: Aug. 20, 2014

(87) PCT Pub. No.: WO2013/124589
PCT Pub. Date: Aug. 29, 2013

(65) Prior Publication Data
US 2015/0020958 A1     Jan. 22, 2015

(30) Foreign Application Priority Data
Feb. 23, 2012 (FR) .................................. 12 51652

(51) Int. Cl.
*B29C 33/38* (2006.01)
*B29C 33/40* (2006.01)
(Continued)

(52) U.S. Cl.
CPC ........... *B29C 33/38* (2013.01); *B29C 33/3807* (2013.01); *B29C 33/3842* (2013.01); *B29C 33/40* (2013.01);
(Continued)

(58) Field of Classification Search
CPC .................................. B29C 33/38; B29C 33/40
(Continued)

(56) References Cited

U.S. PATENT DOCUMENTS

| 3,035,310 A | 5/1962 | Sokol et al. |
| 2008/0241296 A1 | 10/2008 | Wang et al. |
| 2009/0218723 A1* | 9/2009 | Karem .................... B29C 33/40 264/219 |

FOREIGN PATENT DOCUMENTS

| CN | 1772454 A | 5/2006 |
| CN | 101396852 A | 4/2009 |

(Continued)

OTHER PUBLICATIONS

International Search Report issued Apr. 17, 2013, in PCT/FR2013/050358, filed Feb. 21, 2013.

(Continued)

*Primary Examiner* — Daniel Lee
(74) *Attorney, Agent, or Firm* — Oblon, McClelland, Maier & Neustadt, L.L.P.

(57) ABSTRACT

A method of producing tooling for molding a part by resin transfer molding, including: producing a model of the part; producing a countermold with an outside surface presenting an indentation complementary to a first side of the model; placing the model in the indentation of the countermold; draping a plurality of superposed textile layers that are impregnated with thermosetting resin on the model and on the outside surface of the countermold to shape a first half-shell; curing the first half-shell; separating the countermold from the model and from the first half-shell; draping a plurality of superposed textile layers on the first half-shell and the first side of the model, to shape a second half-shell; and curing the second half-shell.

8 Claims, 3 Drawing Sheets

(51) Int. Cl.
  *B29C 70/44*     (2006.01)
  *B29C 67/00*     (2006.01)
  *B29L 31/08*     (2006.01)
  *B29K 307/04*    (2006.01)
  *B29L 31/00*     (2006.01)

(52) U.S. Cl.
  CPC ......... *B29C 70/443* (2013.01); *B29C 67/0051* (2013.01); *B29K 2307/04* (2013.01); *B29L 2031/08* (2013.01); *B29L 2031/757* (2013.01); *Y10T 156/1028* (2015.01)

(58) Field of Classification Search
  USPC .......................................................... 156/212
  See application file for complete search history.

(56) References Cited

FOREIGN PATENT DOCUMENTS

FR    2 864 801 A1    7/2005
WO    2011/158172 A2  12/2011

OTHER PUBLICATIONS

J. Müller, "Werkzeuge aus faserverstärkten Kunststoffen für Hochleistungsbauteile", Kunststoffe, vol. 79, No. 2, XP 000028766, Feb. 1989, pp. 140-145.

\* cited by examiner

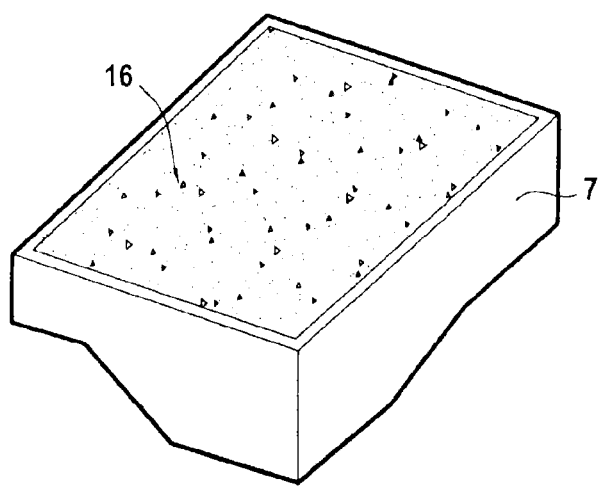
FIG.3A
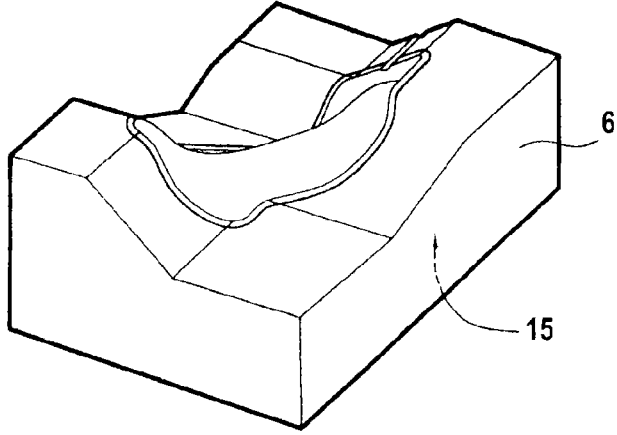
FIG.3B
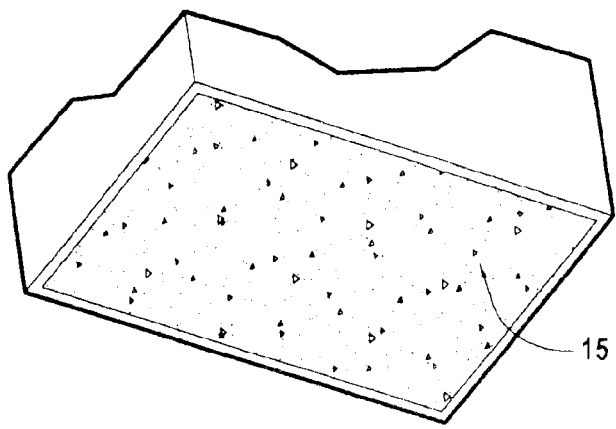

METHOD OF PRODUCING TOOLING FOR RESIN TRANSFER MOLDING

BACKGROUND OF THE INVENTION

The present invention relates to the field of producing elements out of composite material. More particularly, the present invention relates to a method of producing tooling for molding a part by resin transfer molding (RTM), and it also relates to tooling produced by the method.

In an RTM process, a textile preform is inserted into a mold cavity of a mold. After the mold has been closed, a thermosetting resin is injected under pressure into the cavity via injection channels. The pressure is maintained in the cavity for a setting period of the resin, during which the temperature is increased in order to encourage such setting. After unmolding, a composite part is thus obtained made of thermoset plastics material that is reinforced by the fibers of the textile preform, having a shape and dimensions that are accurate, and that normally require only a limited amount of post-treatment. The resin transfer molding (RTM) process thus enables composite parts to be mass produced.

During the RTM process, the textile preform may be subjected to high levels of stress. Although simulation means make it possible, to some extent, to evaluate such stresses in advance in order to define a preform that will give rise to the desired molding, it continues to be necessary to pass via a step of validating a preform, for the purpose of checking for any registration errors in the fibers and also their distribution and density in the final molding, and also checking for overall deformation of the molding, ease of shaping the preform, and other production parameters. In order to proceed with such validation by production testing, it is nevertheless necessary to have production tooling for use in the RTM process.

The tooling used for resin transfer molding is similar to that used in conventional injection molding of plastics. It thus comprises a mold, typically made of metal, and having a mold cavity, which normally requires high precision machining with very small tolerances. In addition, in order to enable temperature to vary in the mold cavity as is normally required for setting the resin, heating and indeed cooling means normally need to be arranged in the mold. Consequently, producing such final tooling for validation testing of a preform would take an excessive length of time and would turn out to be very expensive in the event of failure.

Nevertheless, machining simplified preliminary metal tooling in a block of metal presents other drawbacks. A solid metal mold would not make it possible to reproduce the rate of temperature rise desired for the final production tooling. Furthermore, machining such tooling out of a block can consume precious time.

OBJECT AND SUMMARY OF THE INVENTION

The present invention seeks to remedy those drawbacks. In particular, the invention seeks to propose a method that enables preliminary tooling to be produced quickly and at low cost in order to perform validation tests on preforms for resin transfer molding. Such tooling comprises at least two half-shells arranged so as to be capable of being separated in order to insert the preform into the mold cavity and in order to extract the molded part after it has been cured, while nevertheless being hermetically sealed one against the other during the injection and curing steps of the resin transfer molding process.

In at least one embodiment, this object is achieved by the fact that the method comprises the following steps:
producing a model of the part to be molded;
producing a countermold with an outside surface presenting an indentation complementary to a first side of said model;
placing said model in said indentation of the countermold;
draping a plurality of superposed textile layers that are impregnated with thermosetting resin on the model and on said outside surface of the countermold in order to shape a first half-shell;
curing said first half-shell;
separating the countermold from the model and from the first half-shell;
draping a plurality of superposed textile layers on the first half-shell and the first side of the model, in order to shape a second half-shell; and
curing the second half-shell.

By means of these provisions, the two half-shells obtained in this way can act together to define a mold cavity suitable for being opened in order to insert the preform, for being closed during injection of the resin and curing, and then for being reopened in order to unmold the part. Since the second half-shell is shaped directly on the first half-shell, the two half-shells can present accurately complementary contact surfaces around the mold cavity, thus enabling the mold cavity to be well sealed. In order to form injection and evacuation channels and/or grooves for receiving sealing gaskets, shapes in relief may be machined directly in the contact surfaces of the half-shells, and/or they may be formed on the countermold.

In addition, the walls of the half-shells can be comparatively thin, thus transferring heat better, and thus reproducing more accurately the curing conditions that apply during mass production in a final mold, and in particular conditions concerning temperature rises. In order to ensure that the mold cavity in this preliminary tooling is sufficiently stiff, the tooling may receive reinforcement and stiffeners matching the stresses to which it is to be subjected during preform validation testing. It should be observed that the term "textile layer" covers a layer made up of joined fibers, which layer may be a woven layer, or it may alternatively be a unidirectional layer with long fibers extending exclusively in a single direction, or indeed a layer of non-woven short fibers.

The textile layers of the first and/or second half-shell may comprise carbon fibers, since they provide a high degree of stiffness and good thermal conductivity. Nevertheless, other materials, such as glass fibers, for example, may be envisaged, depending on the thermal and mechanical stresses to which the half-shells are to be subjected. The textile layers may also be layers that have been preimpregnated, i.e. impregnated with thermosetting resin prior to draping so as to simplify the operations needed to perform the draping and to ensure good distribution of the resin. Nevertheless, as an alternative, they could also be impregnated during the draping process.

Prior to their respective curing operations, the first and second half-shells may be evacuated under a leakproof sheet in order to obtain a composite material with reduced porosity and higher fiber content.

It is important to be able to ensure that the tooling is closed during the injection and curing steps of the resin transfer molding process. For this purpose, in a first alternative, each half-shell presents at least one orifice in alignment with a corresponding orifice in the other half-shell for passing a device for clamping the first half-shell against the second half-shell. These orifices may be drilled in the half-shells after they have been cured, or else they may be formed while the half-shells are themselves being formed. In particular, metal inserts including these orifices and reinforcing their peripheries may be incorporated in the half-shells while they are being formed.

In contrast, in a second alternative, the tooling production method may further include at least the following steps:
casting a hardenable fluid material into the concave rear faces of the first and second half-shells; and
hardening said hardenable fluid material in said concave rear faces.

In this way, each half-shell forms a solid block, it being possible for the two half-shells to be pressed against each other in a press so as to ensure that the tooling is closed during the injection and curing steps of the resin transfer molding process. The term "front face" for each half-shell is used to mean its face that comes into contact with the other half-shell when they are closed one against the other, and the term "rear face" is used to mean the face opposite from the front face.

Said hardenable fluid material may for example be concrete, which, after hardening, presents good compression strength and good thermal stability at the temperatures normally used in resin transfer molding processes.

Furthermore, in order to maintain good thermal conductivity in the two half-shells, the hardenable fluid material may include thermally conductive particles, e.g. metal particles.

The model of the part for molding may be produced by a rapid prototyping method, such as for example: stereolithography, laser sintering, fused deposition modeling, or rapid machining. Such a method enables such a physical model to be produced quickly and with small fabrication tolerances, on the basis of virtual models of the part.

The invention also provides the tooling produced by the tooling production method.

BRIEF DESCRIPTION OF THE DRAWINGS

The invention can be well understood and its advantages appear better on reading the following detailed description of several embodiments shown by way of non-limiting example. The description refers to the accompanying drawings, in which:

FIG. 3A is an exploded diagrammatic perspective view of tooling in a second embodiment; and FIG. 3B is a perspective view of the rear face of a first portion of the FIG. 3A tooling.

DETAILED DESCRIPTION OF THE INVENTION

Figure 1:
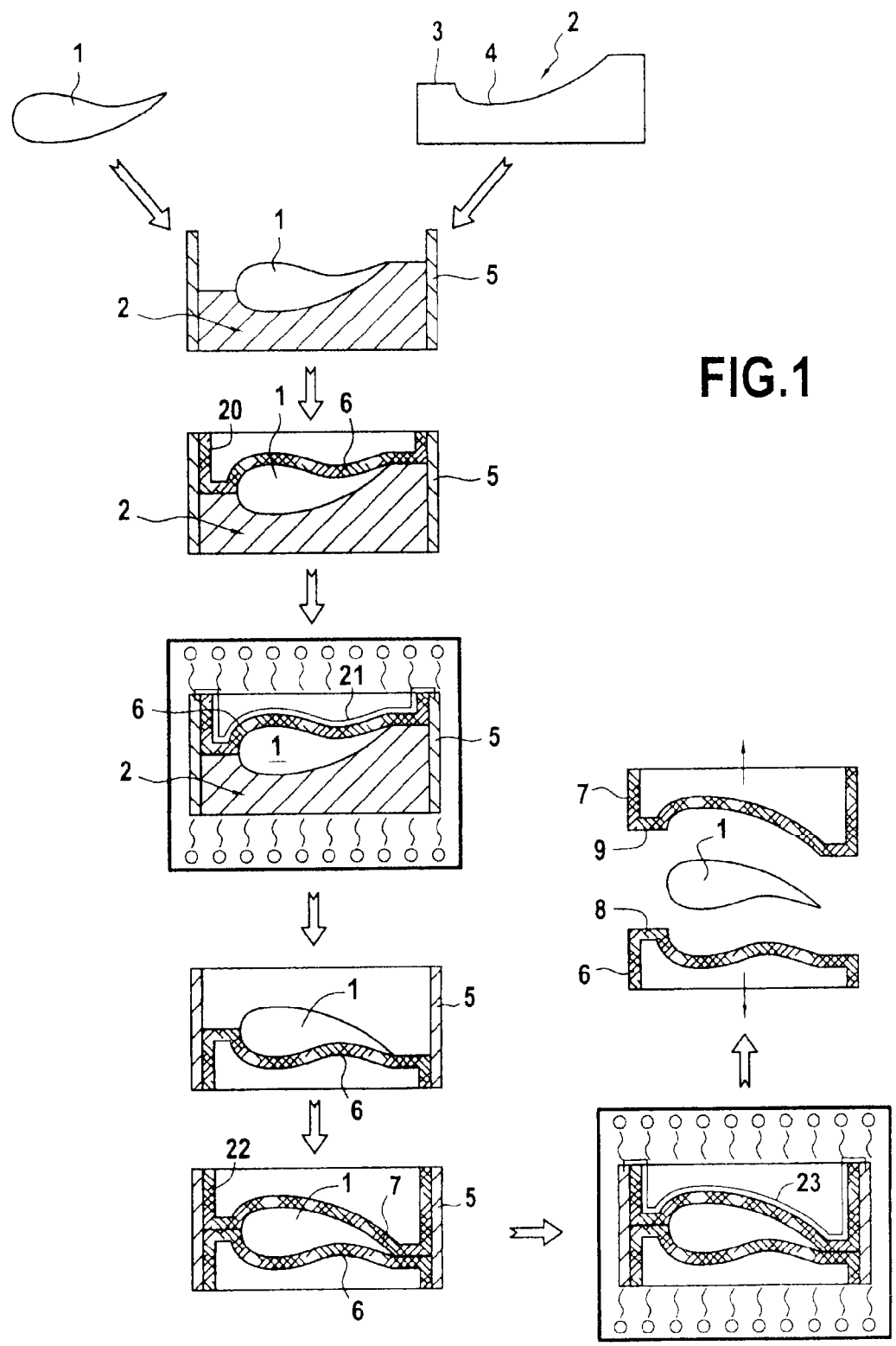
FIG. 1 is a diagrammatic view of a plurality of steps in a method constituting an embodiment of the invention.

The initial steps of a method of producing tooling for molding a part by resin transfer molding in an embodiment of the invention are shown diagrammatically in FIG. 1.

In a first step, a model 1 of the part that is to be molded is produced by a rapid prototyping method, e.g. by stereolithography, on the basis of a virtual model of the part. In parallel, a countermold 2 is produced, e.g. by machining a block of rigid synthetic foam or of pressed wood. The countermold 2 presents a surface 3 having an indentation 4 that is complementary to a first side of the model 1. Around this indentation 4, the surface 3 of the countermold 2 reproduces the outline of a mold-closure surface 8 provided with injection and evacuation channels 24 and 25, and with a groove 26 that is to receive a sealing gasket around the mold cavity.

In a second step, the model 1 is placed in the indentation 4 in order to drape the surface 3 and the exposed side of the model 1 in textile layers of carbon fiber material that is preimpregnated with thermosetting resin, such as an epoxy resin, for example, in order to shape a first half-shell 6. This draping may be performed in a box 5, thus enabling side walls 20 to be formed at the periphery of the first half-shell 6. Thereafter, the first half-shell 6 is evacuated under a leaktight sheet 21 and cured, e.g. in an autoclave, in order to harden the resin.

After this curing step, the countermold 2 is removed in order to expose the front face of the first half-shell 6 and the first side of the model 1, and in a second step other textile layers of carbon fiber material that have been preimpregnated with thermosetting resin are draped thereon in order to form a second half-shell 7. As for the first half-shell 6, the box 5 serves to form side walls 22 around the periphery of the second half-shell 7. Thereafter, the second half-shell 7 is likewise evacuated under a leaktight sheet 23 and cured, e.g. in an autoclave, in order to harden the resin.

After this curing and after the model 1 has been extracted, two half-shells 6 and 7 are thus obtained having front faces that, when placed one against the other, define a mold cavity capable of being used for resin transfer molding of prototypes that may be used for example to verify preforms. Around this mold cavity, the front faces of the half-shells 6 and 7 present surfaces 8 and 9 that are accurately complementary so as to ensure that the mold cavity is sealed when the half-shells 6 and 7 are closed one against the other. In order to ensure that the half-shells 6 and 7 have the stiffness needed for this purpose, their wall thickness and the positioning of stiffeners, if any, on their rear faces may be defined beforehand by using modeling methods and systems. In addition, in order to obtain smooth surfaces that are substantially free from pores, the front faces of the two half-shells 6 and 7 may be treated with a pore-closing coating, such as those sold by the supplier Airétec® under the trademark Cirex®.

During the injection and curing steps of the resin transfer molding process, it is also important to ensure that the tooling is closed so as to maintain pressures of the order of 2 megapascals (MPa) (20 bars) inside the mold cavity. For this purpose, in a first embodiment, shown in particular in FIGS. 2A to 2C, the two half-shells 6 and 7 present orifices 10, 11 in their respective complementary closure surfaces 8, 9 for the purpose of passing bolts 12. These orifices 10, 11 are arranged around the mold cavity, and each of the orifices 10 in the first portion 6 is in alignment with a corresponding orifice 11 in the second portion 7 so as to enable the tooling to be closed by tightening the bolts 12 with nuts (not shown). In the embodiment shown, the orifices 10 and 11 are formed while shaping each of the half-shells 6, 7, by incorporating metal inserts therein. Thus, these metal inserts define the orifices 10 and 11 and simultaneously reinforce the periphery of each orifice. Nevertheless, it is possible alternatively for the orifices to be drilled in the complementary closure surfaces 8, 9 during a supplementary step after curing and unmolding the two mold portions 6, 7. In the same manner, injection and evacuation channels and/or the sealing gasket groove can also be machined in the surfaces 8, 9 after curing the half-shells 6, 7, instead of being molded on the countermold.

Figure 2A:
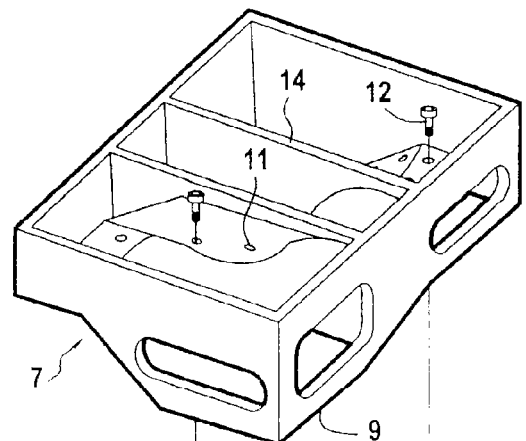
FIG. 2A is a diagrammatic exploded perspective view of tooling in a first embodiment of the invention.
Figure 2A:
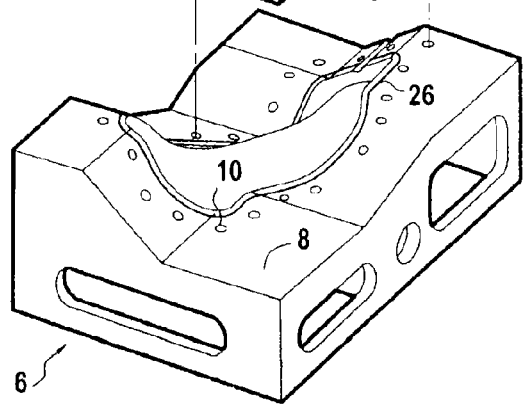
Figure 2B:
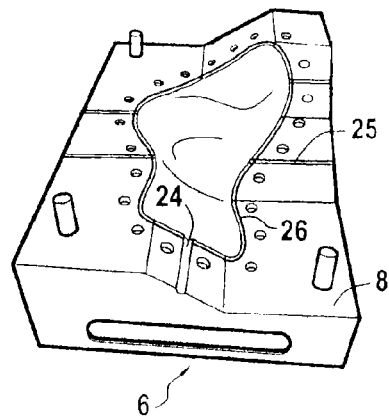
FIGS. 2B and 2C are respective views of front and rear faces of a first mold portion of the FIG. 2A tooling.
Figure 2C:
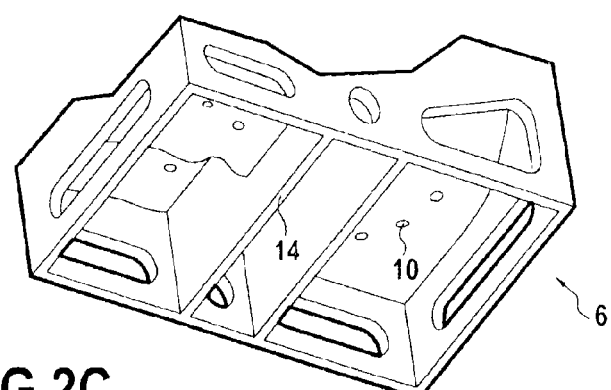

As shown in FIGS. 2A and 2C, stiffeners 14 on the reverse side 15, 16 of each mold portion 6, 7 serve to ensure stiffness during the RTM process. The tooling in this first embodiment may be inserted, while closed, into an autoclave in order to perform at least the curing step of the RTM process.

In a second embodiment shown in FIGS. 3A and 3B, the rear faces 15, 16 of each mold portion 6, 7, as defined by the walls 20, 22, have been filled, after curing each of the mold portions 6, 7, with a hardenable fluid material, in order to form two solid blocks. In particular, in the embodiment shown, the hardenable fluid may be concrete having a fill of thermally conductive metal particles so as to enable the mold cavity to be heated and/or cooled quickly when the tooling is used in an RTM process. In this second embodiment, the tooling may be closed by a press acting in opposite directions on the rear faces 15, 16 of the two mold portions 6, 7 in order to press the front faces against each other.

Although the present invention is described above with reference to specific embodiments, it is clear that various modifications and changes may be made to the embodiments without going beyond the general ambit of the invention as defined by the claims. For example, although the embodiments shown relate solely to producing molds made up of two portions, it is also possible to envisage using the method of the invention to produce molds having a larger number of portions for molding parts of shapes that are more complex. In addition, individual characteristics of the various embodiments described above may be combined in additional embodiments. Consequently, the description and the drawings should be considered in a sense that is illustrative rather than restrictive.

The invention claimed is:

1. A method of producing tooling for molding a part by resin transfer molding, the method comprising:

producing a model of the part;

producing a countermold with an outside surface presenting an indentation complementary to a first side of the model;

placing the model in the indentation of the countermold;

draping a plurality of superposed textile layers that are impregnated with thermosetting resin on the model and on the outside surface of the countermold to shape a first half-shell;

curing the first half-shell;

separating the countermold from the model and from the first half-shell;

draping a plurality of superposed textile layers on the first half-shell and the first side of the model, to shape a second half-shell; and curing the second half-shell.

2. A method according to claim 1, wherein each half-shell presents at least one orifice in alignment with a corresponding orifice in the other half-shell for passing a device for clamping the first half-shell against the second half-shell.

3. A method according to claim 2, wherein the model is produced by a rapid prototyping method.

4. A method according to claim 1, further comprising:

casting a hardenable fluid material into concave rear faces of the first and second half-shells; and hardening the hardenable fluid material in the concave rear faces.

5. A method according to claim 4, wherein the hardenable fluid material includes thermally conductive particles.

6. A method according to claim 4, wherein the hardenable fluid material is concrete.

7. A method according to claim 1, wherein the textile layers comprise carbon fibers.

8. A method according to claim 1, wherein the textile layers are impregnated with thermosetting resin before draping.

* * * * *